(12) United States Patent
Tanaka

(10) Patent No.: US 9,879,747 B2
(45) Date of Patent: Jan. 30, 2018

(54) SHOCK ABSORBER

(71) Applicant: KAYABA INDUSTRY CO., LTD., Tokyo (JP)

(72) Inventor: Kazuhiro Tanaka, Gifu (JP)

(73) Assignee: KYB Corporation, Tokyo (JP)

( * ) Notice: Subject to any disclaimer, the term of this patent is extended or adjusted under 35 U.S.C. 154(b) by 116 days.

(21) Appl. No.: 14/762,307

(22) PCT Filed: Jan. 17, 2014

(86) PCT No.: PCT/JP2014/050788
§ 371 (c)(1),
(2) Date: Jul. 21, 2015

(87) PCT Pub. No.: WO2014/119388
PCT Pub. Date: Aug. 7, 2014

(65) Prior Publication Data
US 2015/0354656 A1 Dec. 10, 2015

(30) Foreign Application Priority Data

Jan. 31, 2013 (JP) .................................. 2013-016880

(51) Int. Cl.
*F16F 9/34* (2006.01)
*F16F 9/348* (2006.01)
*F16F 9/32* (2006.01)

(52) U.S. Cl.
CPC .......... *F16F 9/3484* (2013.01); *F16F 9/3214* (2013.01)

(58) Field of Classification Search
CPC ........ F16F 9/3214; F16F 9/348; F16F 9/3484; F16F 9/3485; F16F 9/3487
See application file for complete search history.

(56) References Cited

FOREIGN PATENT DOCUMENTS

| JP | 04-097133 U | | 8/1992 |
|----|-------------|---|--------|
| JP | 08093830 A | * | 4/1996 |
| JP | 2006-183775 A | | 7/2006 |
| JP | 2009-204147 A | | 9/2009 |
| JP | 2009-222124 A | | 10/2009 |
| JP | 2011-094779 A | | 5/2011 |

* cited by examiner

*Primary Examiner* — Anna M Momper
(74) *Attorney, Agent, or Firm* — Rabin & Berdo, P.C.

(57) ABSTRACT

A shock absorber includes a valve disc defining two chambers, a flow passage formed in the valve disc, the flow passage allowing communication between the two chambers, a window formed in the valve disc, the window being connected to the flow passage, a valve seat formed on the valve disc, the valve seat surrounding the outer periphery of the window; and a plurality of leaf valves formed in the shape of annular plates, the plurality of leaf valves being stacked on the valve disc. The first leaf valve stacked on the valve disc is provided such that an outer peripheral part is seatable on and separable from the valve seat, and includes a rib recessed on a valve disc side and projecting on an opposite valve disc side at a position facing the valve seat.

3 Claims, 12 Drawing Sheets

SHOCK ABSORBER

TECHNICAL FIELD

The present invention relates to an improvement of a shock absorber.

BACKGROUND ART

A shock absorber is used in vehicles, devices, structures and the like. Generally, such a shock absorber includes a cylinder in which working fluid is sealed, a piston in sliding contact with the inner peripheral surface of the cylinder to partition the interior of the cylinder into two chambers, a piston rod having one end part coupled to the piston and the other end side extending outwardly of the cylinder, a flow passage allowing communication between the two chambers and damping force generation means for applying resistance to the working fluid passing in the flow passage.

For example, in a shock absorber used as the one for vehicle, a cylinder is coupled to one of a vehicle body side as a vibration damping target and a wheel side as a vibration input part and a piston rod is coupled to the other of the vehicle body side and the wheel side. In such a shock absorber, a piston moves in the cylinder by the input of vibration and the working fluid in one chamber pressurized by the piston moves to the other chamber through the flow passage. Thus, the shock absorber can suppress vibration by generating a damping force resulting from the resistance of damping force generation means.

A shock absorber disclosed in JP1992-97133U includes a piston as a valve disc defining two chambers, a flow passage formed in the piston to allow communication between the two chambers, a window formed in the piston and connected to the flow passage, a valve seat formed on the piston and surrounding the outer periphery of the window, a plurality of leaf valves in the form of annular plates stacked on the piston, and an inner leaf valve and an outer leaf valve arranged substantially in the middle of these leaf valves. In the shock absorber disclosed in JP1992-97133U, the leaf valves, the inner leaf valve and the outer leaf valve serve as damping force generation means for applying resistance to working fluid passing in the flow passage.

Further, the outer leaf valve is arranged on the outer periphery of the inner leaf valve and formed to be thicker than the inner leaf valve. Thus, in the shock absorber disclosed in JP1992-97133U, a valve opening pressure of the leaf valves can be set high by applying initial deflection to the leaf valves stacked at an opposite piston side of the outer leaf valve and a large damping force can be generated when a piston speed is in a medium/high speed region.

When the piston speed is in the low-speed region, the working fluid passes through a known orifice formed by cuts provided on the leaf valves and a groove provided on the valve seat. Thus, the shock absorber can generate a damping force resulting from the resistance of the orifice.

SUMMARY OF INVENTION

However, in the above shock absorber, a configuration for applying initial deflection to the leaf valves and a configuration for forming the orifice need to be separately provided and the structure of the shock absorber becomes complicated.

The present invention aims to provide a shock absorber capable of applying initial deflection to leaf valves and forming an orifice by a simple structure.

According to one aspect of the present invention, a shock absorber includes a valve disc defining two chambers, a flow passage formed in the valve disc, the flow passage allowing communication between the two chambers, a window formed in the valve disc, the window being connected to the flow passage, a valve seat formed on the valve disc, the valve seat surrounding the outer periphery of the window; and a plurality of leaf valves formed in the shape of annular plates, the plurality of leaf valves being stacked on the valve disc. The first leaf valve stacked on the valve disc is provided such that an outer peripheral part is seatable on and separable from the valve seat, and includes a rib recessed on a valve disc side and projecting on an opposite valve disc side at a position facing the valve seat.

DESCRIPTION OF EMBODIMENTS

Hereinafter, embodiments of the present invention are described with reference to the accompanying drawings. The same reference signs denote the same or corresponding components throughout the drawings.

Figure 1:
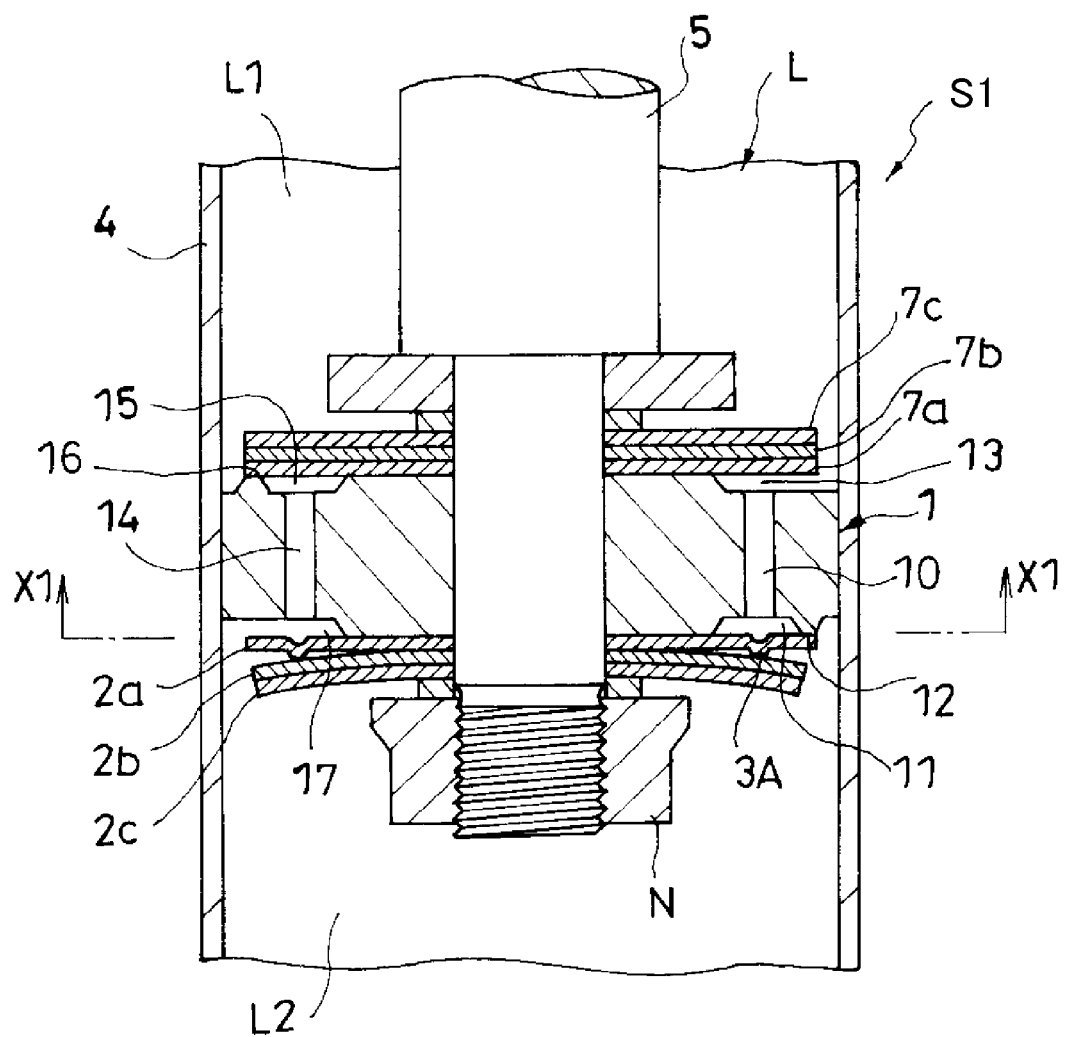
FIG. 1 is a vertical sectional view along a line Y1-Y1 of FIG. 2 showing a piston part in a shock absorber according to an embodiment of the present invention.

As shown in FIG. 1, a shock absorber S1 according to an embodiment of the present invention includes a piston 1 (valve disc) defining an expansion-side chamber L1 and a compression-side chamber L2 (two chambers), expansion-side flow passages (flow passage) 10 formed in the piston 1 and allowing communication between the expansion-side chamber L1 and the compression-side chamber L2, windows 11 formed in the piston 1 and connected to the expansion-side flow passages 10, valve seats 12 formed on the piston 1 and surrounding the outer peripheries of the windows 11, and a plurality of expansion-side leaf valves (leaf valves) 2a to 2c formed in the shape of annular plates stacked on the piston 1.

The first expansion-side leaf valve 2a stacked on the piston 1 is provided such that an outer peripheral part thereof is seatable on and separable from the valve seats 12. The first expansion-side leaf valve 2a includes a rib 3A provided at a position facing the valve seats 12. The rib 3A is recessed on a piston side (valve disc side) and projecting on an opposite piston side (opposite valve disc side) opposite to the piston.

The shock absorber S1 is described in detail below. The shock absorber S1 is an upright single-cylinder type fluid pressure shock absorber interposed between a vehicle body and a wheel of an automotive vehicle and stores liquid such as oil, water or solution as working fluid. Since being known, the configuration of the shock absorber S1 is not shown in detail. The shock absorber S1 includes a cylinder 4 coupled to a wheel side, the piston 1 in sliding contact with the inner peripheral surface of the cylinder 4, a piston rod 5 having one end part coupled to the piston 1 by a nut N and the other end side extending outwardly of the cylinder 4 and coupled to a vehicle body side, an annular rod guide (not shown) fixed to a vehicle body side opening end part of the cylinder 4, a free piston (not shown) in sliding contact with the inner peripheral surface of the cylinder 4 on the opposite piston rod side and a bottom cap (not shown) for closing a wheel side opening of the cylinder 4.

The piston rod 5 penetrates through an axial central part of the rod guide and is rotatably supported to be movable in an axial direction by the rod guide. An annular seal in sliding contact with the outer peripheral surface of the piston rod 5 is fixed to the inner periphery of the rod guide. A clearance between the rod guide and the cylinder 4 is closed by this seal.

In the cylinder 4, the working fluid is stored between the rod guide and the free piston, thereby forming a liquid chamber L. In the cylinder 4, gas is enclosed between the free piston and the bottom cap, thereby forming a gas chamber (not shown). The liquid chamber L is partitioned into two chambers by the piston 1. Out of the two chambers, the chamber on a piston rod side (upper side in FIG. 1) is the expansion-side chamber L1 and the one on an opposite piston rod side (lower side in FIG. 1) opposite to the piston rod is the compression-side chamber L2.

When the piston rod 5 is retracted from the cylinder 4, i.e. during the expansion of the shock absorber S1, a cylinder interior volume increases by a volume of a retracted part of the piston rod, wherefore the free piston moves to the vehicle body side to enlarge a volume of the gas chamber. When the piston rod 5 is inserted into the cylinder 4, i.e. during the compression of the shock absorber S1, the cylinder interior volume decreases by a volume of an inserted part of the piston rod, wherefore the free piston moves to the wheel side to reduce the volume of the gas chamber. As just described, in the present embodiment, a change of the cylinder interior volume corresponding to the volume of the retracted or inserted part of the piston rod into or from the cylinder during the expansion/compression of the shock absorber S1 is compensated for by the unillustrated gas chamber.

The piston 1 in sliding contact with the inner peripheral surface of the cylinder 4 is a valve disc which defines the expansion-side chamber L1 and the compression-side chamber L2 as the two chambers. The piston 1 is formed with expansion-side and compression-side flow passages 10, 14 allowing communication between the expansion-side chamber L1 and the compression-side chamber L2. The piston 1 is formed with opening windows 13 connected to starting ends of the expansion-side flow passages 10, windows 15 connected to final ends of the compression-side flow passages 14 and valve seats 16 surrounding the outer peripheries of the windows 15 to partition between the windows 15 and the opening windows 13 on an expansion-side chamber side (upper side in FIG. 1). The piston 1 is formed with opening windows 17 connected to starting ends of the compression-side flow passages 14, the windows 11 connected to final ends of the expansion-side flow passages 10 and valve seats 12 surrounding the outer peripheries of the windows 11 to partition between the windows 11 and the opening windows 17 on a compression-side chamber side (lower side in FIG. 1).

The opening windows 13 on the expansion-side chamber side connected to the expansion-side flow passages 10 are open to the expansion-side chamber L1 and constantly allow communication between the expansion-side chamber L1 and the expansion-side flow passages 10. On the other hand, the opening windows 17 on the compression-side chamber side connected to the compression-side flow passages 14 are open to the compression-side chamber L2 and constantly allow communication between the compression-side chamber L2 and the compression-side flow passages 14.

Figure 2:
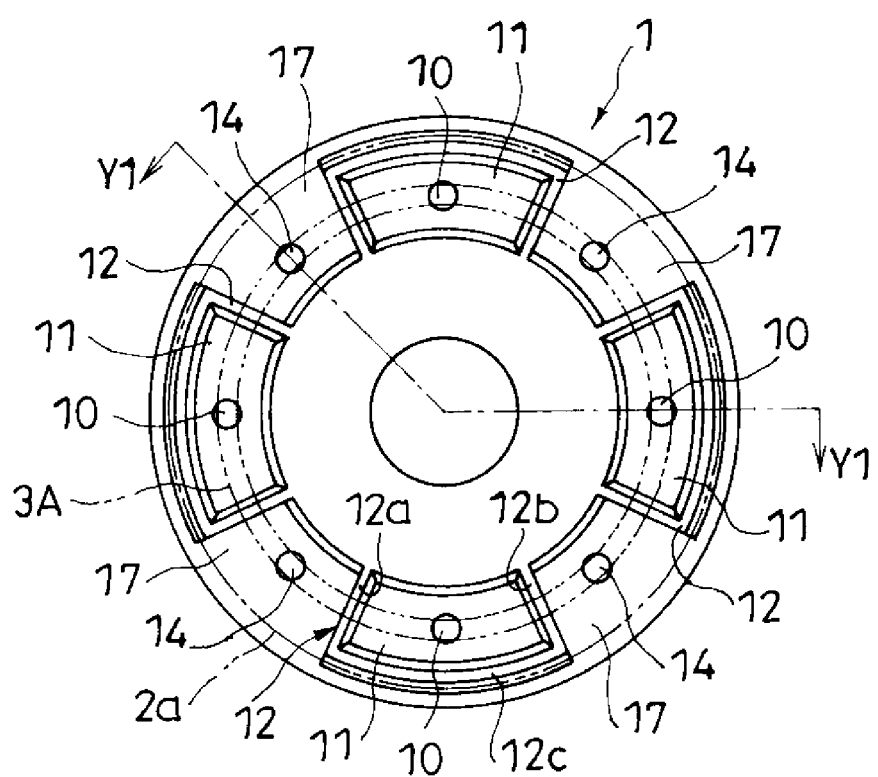
FIG. 2 is a sectional view along a line indicated by arrows X1-X1 of FIG. 1.

As shown in FIG. 2, a plurality of valve seats 12 surrounding the windows 11 on the compression-side chamber side connected to the expansion-side flow passages 10 are arranged along a circumferential direction of the piston 1 to be formed into petal-like shape. Each of the valve seats 12 is formed into a fan shape and individually defines an outlet of each of a plurality of expansion-side flow passages 10. Each valve seat 12 includes a pair of radial seating surfaces 12a, 12b extending outward (direction separating from a center of the piston 1) from a central side of the piston 1 and an outer seating surface 12c connecting outer ends of the radial seating surfaces 12a, 12b and arcuately formed on an outer peripheral side of the piston 1. On the other hand, although not shown, the valve seats 16 surrounding the windows 15 on the expansion-side chamber side connected to the compression-side flow passages 14 are configured similarly to the valve seats 12.

As shown in FIG. 1, a plurality of leaf valves 2a to 2c, 7a to 7c formed in the shape of annular plates are stacked on each of the compression-side chamber side and the expansion-side chamber side on the piston 1. The leaf valves stacked on the compression-side chamber side of the piston 1 are the expansion-side leaf valves 2a to 2c. The leaf valves stacked on the expansion-side chamber side of the piston 1 are compression-side leaf valves 7a to 7c. Although three expansion-side leaf valves 2a to 2c and three compression-side leaf valves 7a to 7c are provided in FIG. 1, the numbers of the stacked leaf valves can be appropriately changed.

A state where outer peripheral parts of the first leaf valves 2a, 7a closest to the piston out of the expansion-side and compression-side leaf valves 2a to 2c, 7a to 7c are seated on the valve seats 12, 16 is shown in FIG. 1. In this state, the expansion-side leaf valves 2a to 2c close the outlets of the expansion-side flow passages 10 and the compression-side leaf valves 7a to 7c close outlets of the compression-side flow passages 14. When a pressure in the expansion-side chamber L1 exceeds that in the compression-side chamber L2 and a differential pressure between the two chambers reaches a valve opening pressure, the outer peripheral parts of the expansion-side leaf valves 2a to 2c are deflected toward the opposite piston side and the first expansion-side leaf valve 2a is separated from the valve seat 12 to open the expansion-side flow passages 10. On the contrary, when the pressure in the compression-side chamber L2 exceeds that in the expansion-side chamber L1 and the differential pressure between the two chambers reaches the valve opening pressure, the outer peripheral parts of the compression-side leaf valves 7a to 7c are deflected toward the opposite piston side and the first compression-side leaf valve 7a is separated from the valve seats 16 to open the compression-side flow passages 14.

Figure 3A:
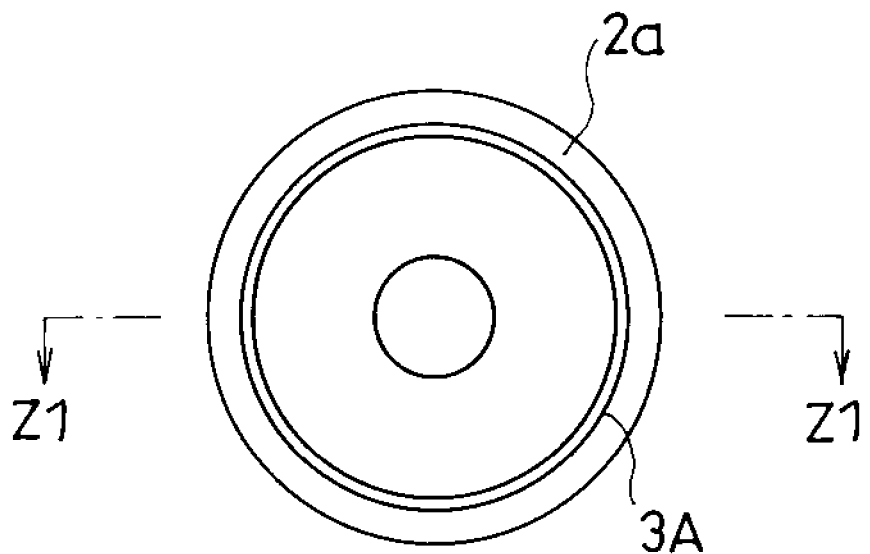
FIG. 3A is a plan view of a first expansion-side leaf valve in the shock absorber according to the embodiment of the present invention.
Figure 3B:
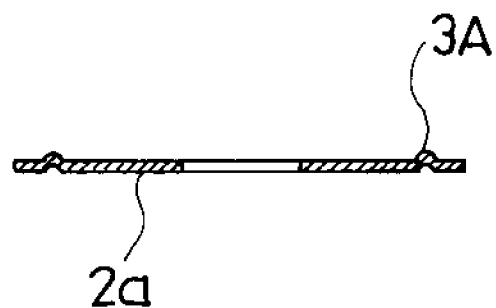
FIG. 3B is an end view cut along a line Z1-Z1 of FIG. 3A.

As shown in FIG. 3, the circular annular rib 3A recessed on the piston side and projecting on the opposite piston side is formed on the first leaf valve 2a out of the expansion-side leaf valves 2a to 2c. Thus, as shown in FIG. 1, initial deflection corresponding to the height of the rib 3A is applied to the second and subsequent expansion-side leaf valves 2b, 2c. The rib 3A is set to intersect with the radial seating surfaces 12a, 12b of the valve seats 12 on the compression-side chamber side. That is, the rib 3A is formed to overlap the radial seating surfaces 12a, 12b of the valve seats 12 on the compression-side chamber side as shown in FIG. 2 when the leaf valve 2a stacked on the piston 1 is viewed in the axial direction. The rib 3A forms orifices between the radial seating surfaces 12a, 12b of the valve seats 12 in a state where the outer peripheral part of the first expansion-side leaf valve 2a is seated on the valve seats 12. The rib 3A constantly allows communication between the expansion-side chamber L1 and the compression-side chamber L2 via these orifices.

The rib 3A is formed by sandwiching a material between a pair of tools and plastically deforming the material into the shapes of the tools such as by press-working. Thus, the rib 3A can be easily caused to be recessed on the piston side and, simultaneously, caused to project on an opposite side of this part, and can be easily formed on the leaf valve 2a. In a case where it is possible to cause the piston side of the leaf valve 2a to be recessed and cause the side opposite to this part to project, a rib forming method is not limited to the above one and can be appropriately selected.

Next, the operation of the shock absorber S1 is described. In a case where a piston speed is in a low speed region when the piston rod 5 is retracted from the cylinder 4, i.e. during the expansion of the shock absorber S1, the first expansion-side leaf valve 2a is kept seated on the valve seats 12 and the expansion-side leaf valves 2a to 2c do not open the expansion-side flow passages 10. The working fluid in the expansion-side chamber L1 pressurized by the piston 1 passes through the orifices formed by the rib 3A and moves to the compression-side chamber L2 through the expansion-side flow passages 10.

Thus, the shock absorber S1 generates an expansion-side low-speed damping force due to the resistance of the orifices formed by the rib 3A.

When the piston speed increases to be out of the low speed region and reaches a medium/high speed region during the expansion of the shock absorber S1, a differential pressure between the expansion-side chamber L1 and the compression-side chamber L2 reaches the valve opening pressure of the expansion-side leaf valves 2a to 2c. As a result, the outer peripheral parts of the expansion-side leaf valves 2a to 2c are deflected toward the opposite piston side to open the expansion-side flow passages 10. Thus, the working fluid in the expansion-side chamber L1 pressurized by the piston 1 passes between the first expansion-side leaf valve 2a and the valve seat 12 and moves to the compression-side chamber L2 through the expansion-side flow passages 10.

As just described, the shock absorber S1 generates an expansion-side medium/high-speed damping force due to resistance by the expansion-side leaf valves 2a to 2c when the piston speed is in the medium/high speed region. Since initial deflection is applied to the second and subsequent expansion-side leaf valves 2b, 2c by the rib 3A, the expansion-side medium/high-speed damping force can be made larger.

Although the piston speed region is divided into the low-speed region and the medium/high speed region in the above description, threshold values of each region can be arbitrarily set.

Next, functions and effects of the shock absorber S1 are described. The shock absorber S1 includes the piston 1 (valve disc) defining the expansion-side chamber L1 and the compression-side chamber L2 (two chambers), the expansion-side flow passages (flow passage) 10 formed in the piston 1 and allowing communication between the expansion-side chamber L1 and the compression-side chamber L2, the windows 11 formed in the piston 1 and connected to the expansion-side flow passages 10, the valve seats 12 formed on the piston 1 and surrounding the outer peripheries of the windows 11 and the plurality of expansion-side leaf valves (leaf valves) 2a to 2c formed in the shape of annular plates and stacked on the piston 1.

The first expansion-side leaf valve 2a stacked on the piston 1 is provided such that the outer peripheral part is seatable on and separable from the valve seats 12. The first expansion-side leaf valve 2a includes the rib 3A provided at the position facing the valve seats 12. The rib 3A is recessed on the piston side (valve disc side) and projecting on the opposite piston side (opposite valve disc side).

By forming the rib 3A on the first expansion-side leaf valve 2a stacked on the piston 1 that is a valve disc, initial deflection can be applied to the second and subsequent expansion-side leaf valves 2b, 2c and, simultaneously, the orifices can be formed between the rib 3A and the valve seats 12.

As just described, it becomes possible to apply initial deflection to the expansion-side leaf valves 2b, 2c and form the orifices only by forming the rib 3A on the first expansion-side leaf valve 2a, and the structure of the shock absorber S1 can be simplified.

In the present embodiment, the valve seat 12 has the radial seating surfaces 12a, 12b extending outward (direction separating from the center of the piston) from the central side of the piston (valve disc) 1. The rib 3a has a circular annular shape and is formed to overlap the radial seating surfaces 12a, 12b in the axial direction.

Since a distance from a center of the first expansion-side leaf valve 2a to the rib 3A is constant, the rib 3A can be arranged at the position facing the valve seats 12 even without circumferentially positioning the piston 1 and the first expansion-side leaf valve 2a.

Next, a shock absorber S2 according to another embodiment of the present invention is described. The following description focuses on differences with the above embodiment. Identical configurations to the shock absorber S1 according to the above embodiment have been allocated identical reference symbols, and description thereof has been omitted. The shock absorber S2 according to the other embodiment differs from the shock absorber S1 only in the shapes of the piston and the rib and the other components and the operation of the shock absorber S2 are similar.

Figure 4:
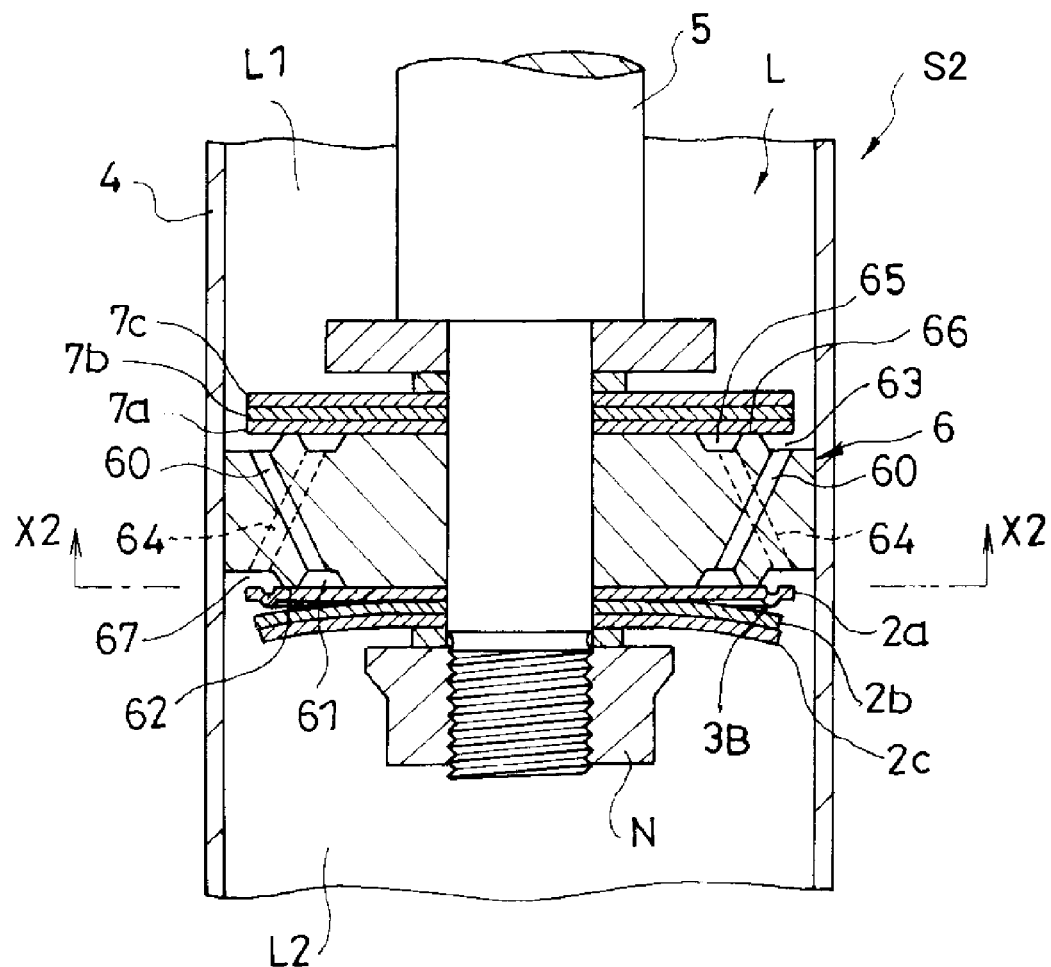
FIG. 4 is a sectional view along a line Y2-Y2 of FIG. 5 showing a piston part in a shock absorber according to another embodiment of the present invention.

As shown in FIG. 4, also in the shock absorber S2, a piston 6 is a valve disc defining an expansion-side chamber L1 and a compression-side chamber L2 as two chambers as in the shock absorber S1. The piston 6 is formed with expansion-side and compression-side flow passages 60, 64 allowing communication between the expansion-side chamber L1 and the compression-side chamber L2. The piston 6 is formed with opening windows 63 connected to starting ends of the expansion-side flow passages 60, windows 65 connected to final ends of the compression-side flow passages 64 and a valve seat 66 surrounding the outer peripheries of the windows 65 and partitioning between the windows 65 and the opening windows 63 on an expansion-side chamber side (upper side in FIG. 4). The piston 6 is formed with opening windows 67 connected to starting ends of the compression-side flow passages 64, windows 61 connected to final ends of the expansion-side flow passages 60 and a valve seat 62 surrounding the outer peripheries of the windows 61 and partitioning between the windows 61 and the opening windows 67 on a compression-side chamber side (lower side in FIG. 4).

The opening windows 63 on the expansion-side chamber side connected to the expansion-side flow passages 60 are open to the expansion-side chamber L1 and constantly allow communication between the expansion-side chamber L1 and the expansion-side flow passages 60. On the other hand, the opening windows 67 on the compression-side chamber side connected to the compression-side flow passage 64 are open to the compression-side chamber L2 and constantly allow communication between the compression-side chamber L2 and the compression-side flow passages 64.

Figure 5:
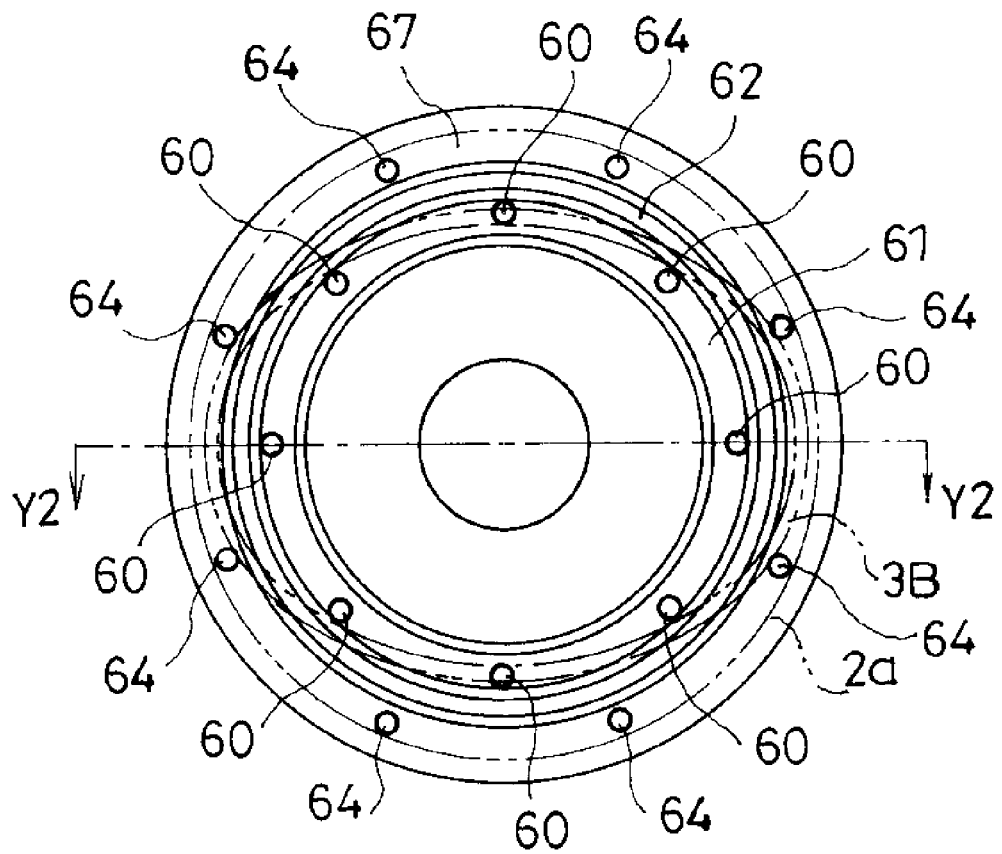
FIG. 5 is a sectional view along a line indicated by arrows X2-X2 of FIG. 4.

As shown in FIG. 5, the valve seat 62 surrounding the windows 61 on the compression-side chamber side connected to the expansion-side flow passages 60 is formed into a circular annular shape and integrally surrounds outlets of all the plurality of expansion-side flow passages 60. Although not shown, the valve seat 66 surrounding the windows 65 on the expansion-side chamber side connected to the compression-side flow passages 64 is configured similarly to the above valve seat 62.

Also in the shock absorber S2, a rib 3B is formed on a first expansion-side leaf valve 2a located closest to the piston out of a plurality of expansion-side leaf valves 2a to 2c in the form of annular plates stacked on the compression-side chamber side of the piston 6. The rib 3B is formed to be recessed on a piston side and projecting on an opposite piston side. Thus, as shown in FIG. 4, initial deflection corresponding to the height of the rib 3B is applied to the second and subsequent expansion-side leaf valves 2b, 2c as in the shock absorber S1.

Figure 6A:
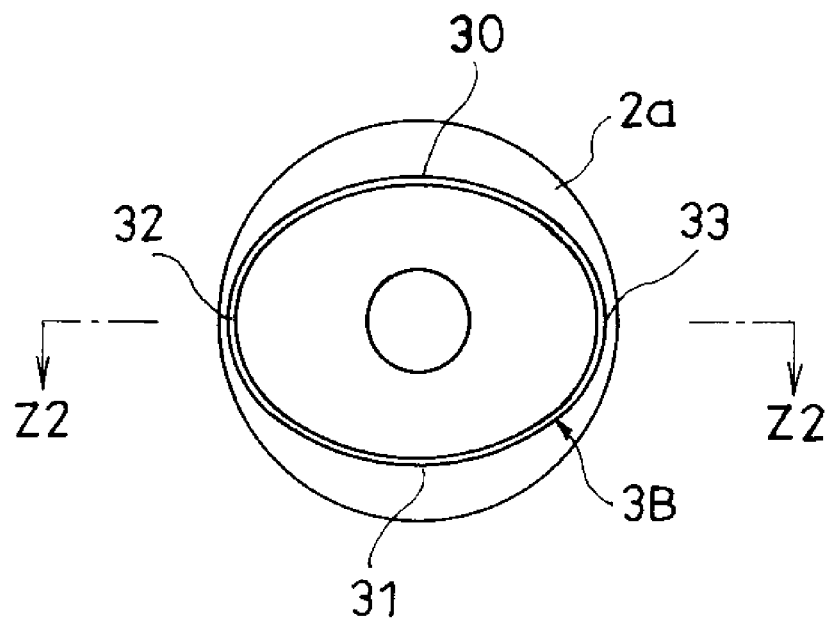
FIG. 6A is a plan view of a first expansion-side leaf valve in a shock absorber according to another embodiment of the present invention.
Figure 6B:
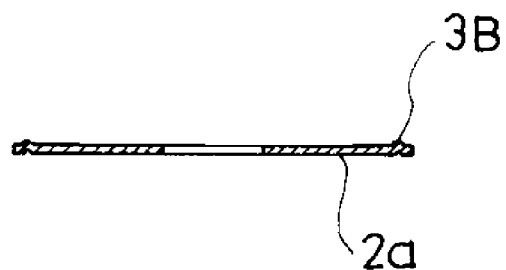
FIG. 6B is an end view cut along a line Z2-Z2 of FIG. 6A.

The rib 3B is formed into an elliptical annular shape as shown in FIG. 6. Upper and lower parts 30, 31 in FIG. 6 are arranged on a central side of the first expansion-side leaf valve 2a and left and right parts 32, 33 in FIG. 6 are provided to extend outward (direction separating from a center of the piston 6). As shown in FIG. 5, the rib 3B is set to intersect with a seating surface of the valve seat 62 on the compression-side chamber side. That is, the rib 3B is formed to overlap the seating surface of the valve seat 62 on the compression-side chamber side when the leaf valve 2a stacked on the piston 1 is viewed in an axial direction. Thus, an orifice is formed between the rib 3B and the valve seat 62 and the expansion-side chamber L1 and the compression-side chamber L2 constantly communicate via the orifice in a state where an outer peripheral part of the first expansion-side leaf valve 2a is seated on the valve seat 62.

Next, functions and effects of the shock absorber S2 are described. Similarly to the shock absorber S1, the shock absorber S2 includes the piston (valve disc) defining the expansion-side chamber L1 and the compression-side chamber L2 (two chambers), the expansion-side flow passages (flow passage) 60 formed in the piston 6 and allowing communication between the expansion-side chamber L1 and the compression-side chamber L2, the windows 61 formed in the piston 6 and connected to the expansion-side flow passages 60, the valve seat 62 formed on the piston 6 and surrounding the outer peripheries of the windows 61 and the plurality of expansion-side leaf valves (leaf valves) 2a to 2c in the form of annular plates stacked on the piston 6.

The first expansion-side leaf valve 2a stacked on the piston 6 is provided such that the outer peripheral part is seatable on and separable from the valve seat 62. The first expansion-side leaf valve 2a includes the rib 3B provided at a position facing the valve seat 62. The rib 3B is recessed on the piston side (valve disc side) and projecting on the opposite piston side (opposite valve disc side).

By forming the rib 3B on the first expansion-side leaf valve 2a stacked on the piston 6 that is a valve disc, initial deflection can be applied to the second and subsequent expansion-side leaf valves 2b, 2c and, simultaneously, the orifice can be formed between the rib 3B and the valve seat 62.

As just described, it is possible to apply initial deflection to the expansion-side leaf valves 2b, 2c and form the orifice only by forming the rib 3B on the first expansion-side leaf valve 2a. Thus, the structure of the shock absorber S2 can be simplified.

In the shock absorber S2, the valve seat 62 is formed into a circular annular shape. The rib 3B is set to extend outward (direction separating from the center of the leaf valve 2a) from the central side of the first expansion-side leaf valve 2a and intersect with the above valve seat 62.

Thus, a distance from the center of the piston 6 to the valve seat 62 is constant, wherefore the rib 3B can be arranged at the position facing the valve seat 62 even without circumferentially positioning the piston 6 and the first expansion-side leaf valve 2a.

Embodiments of this invention were described above, but the above embodiments are merely examples of applications of this invention, and the technical scope of this invention is not limited to the specific constitutions of the above embodiments.

For example, although the shock absorber S1, S2 is a shock absorber for automotive vehicle in each of the above embodiments, it may be a shock absorber for another vehicle or may be a shock absorber other than for vehicle.

Further, in each of the above embodiments, the shock absorber S1, S2 is an upright single-cylinder type fluid pressure shock absorber and can compensate for the cylinder interior volume change corresponding to the volume of the inserted or retracted part of the piston rod into or from the cylinder and a working fluid volume change caused by a temperature change by the unillustrated gas chamber. Instead of this, the shock absorber S1, S2 may include a reservoir for storing the working fluid and gas and a base member for partitioning between the reservoir and the compression-side chamber L2, and a change of the cylinder interior volume and a volume change of the working fluid may be compensated for by the reservoir.

Further, in each of the above embodiments, the leaf valve formed with the rib 3A, 3B is the expansion-side leaf valve 2a, which is stacked on the piston 1, 6 of the shock absorber S1, S2. In a case where the shock absorber S1, S2 includes a base member, the base member may be used as a valve disc and the leaf valve formed with the rib 3A, 3B may be stacked on the base member.

Further, the shock absorber S1, S2 may be a multi-cylinder type shock absorber including an outer tube arranged outside the cylinder 4 and a reservoir formed between the outer tube and the cylinder 4, or a pneumatic shock absorber utilizing air as the working fluid or an inverted shock absorber.

Further, the shape of the rib 3A, 3B formed on the first expansion-side leaf valve 2a and the shape of the valve seat(s) 12, 62 on and from which the outer peripheral part of the leaf valve 2a is seated and separated are not limited to the above ones and can be appropriately selected.

For example, two or three circular annular ribs 3A may be formed and arranged to radially overlap on the first expansion-side leaf valve 2a in the shock absorber S1. In this case, cracking points can be increased by adding the rib(s).

Figure 7A:
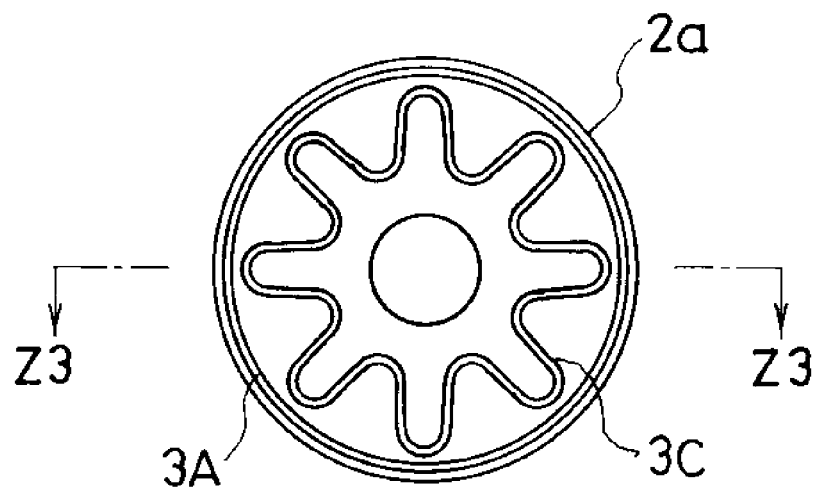
FIG. 7A is a plan view showing a modification of the first expansion-side leaf valve according to the embodiment of the present invention.
Figure 7B:
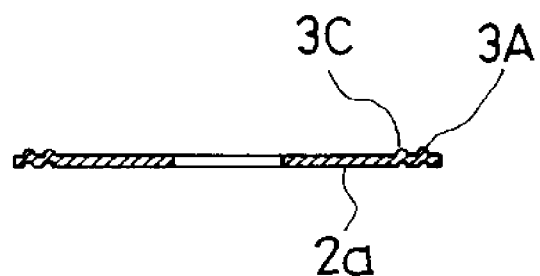
FIG. 7B is an end view cut along a line Z3-Z3 of FIG. 7A.

Further, as shown in FIG. 7, the first expansion-side leaf valve 2a may be provided with a petal-shaped (star-shaped) rib 3C inside the circular annular rib 3A. In this case, the rigidity of the first leaf valve 2a can be easily increased and the valve opening pressure of the expansion-side leaf valves 2a to 2c can be easily further increased.

Further, the shape of the rib 3B formed on the first expansion-side leaf valve 2a in the shock absorber S2 according to the other embodiment may be changed as shown in FIGS. 8 to 12.

Figure 8A:
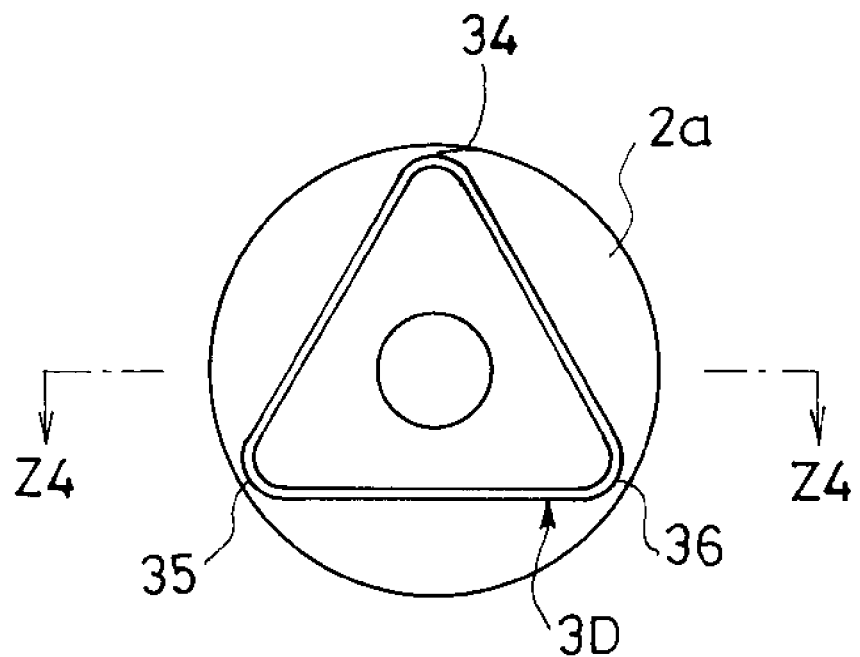
FIG. 8A is a plan view showing a first modification of the first expansion-side leaf valve according to the other embodiment of the present invention.
Figure 8B:
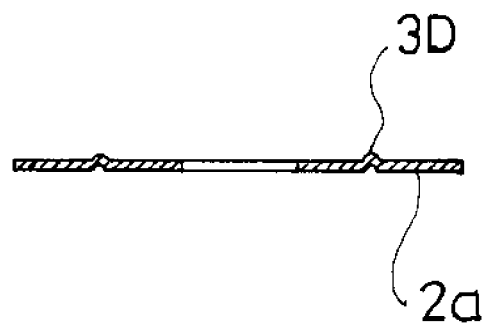
FIG. 8B is an end view cut along a line Z4-Z4 of FIG. 8A.

A rib 3D shown in FIG. 8 is formed into a triangular shape and vertex parts 34, 35 and 36 extend in directions separating from the center of the first expansion-side leaf valve 2a (outward).

Figure 9A:
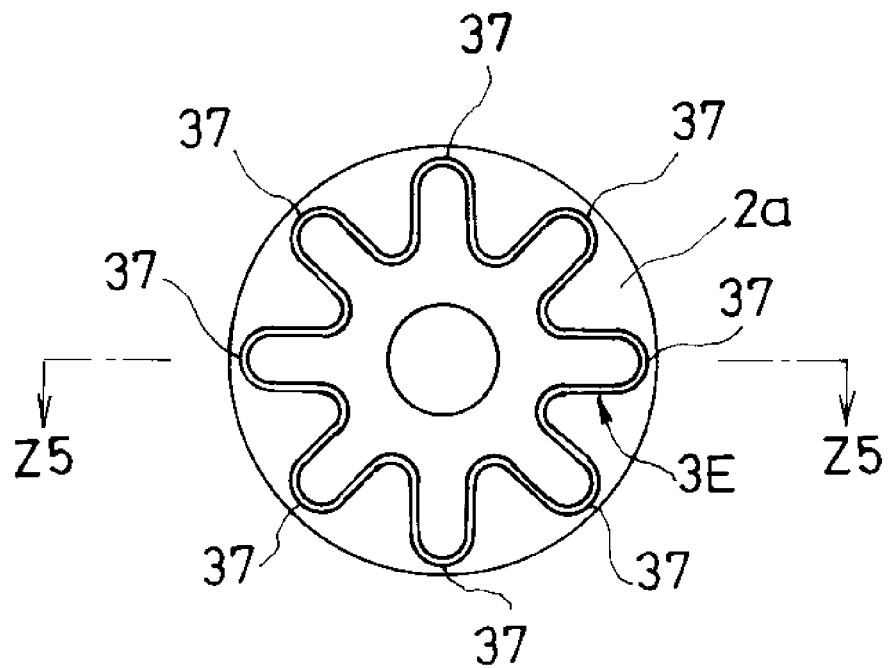
FIG. 9A is a plan view showing a second modification of the first expansion-side leaf valve according to the other embodiment of the present invention.
Figure 9B:
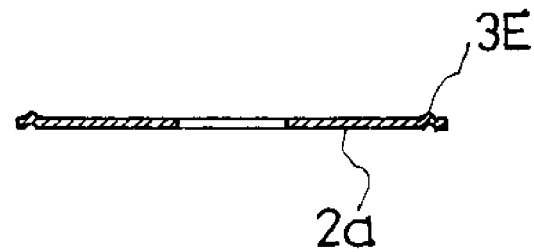
FIG. 9B is an end view cut along a line Z5-Z5 of FIG. 9A.

A rib 3E shown in FIG. 9 is formed into a petal-like shape (star-like shape) and includes foot parts 37 radially extending outward (direction separating from the center of the leaf valve 2a) from the central side of the first expansion-side leaf valve 2a.

Figure 10A:
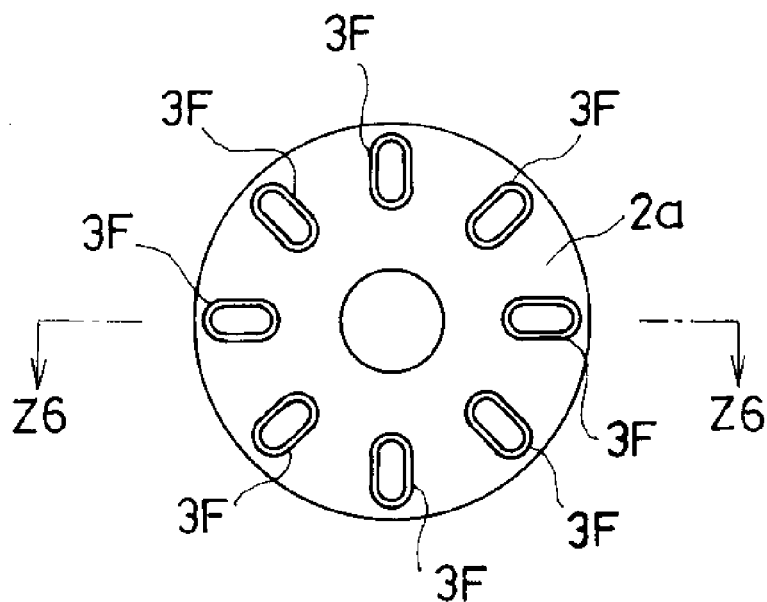
FIG. 10A is a plan view showing a third modification of the first expansion-side leaf valve according to the other embodiment of the present invention.
Figure 10B:
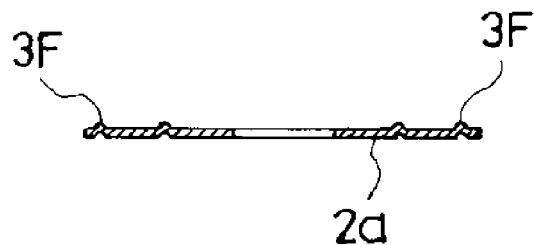
FIG. 10B shows an example of an end view cut along a line Z6-Z6 of FIG. 10A.
Figure 10C:
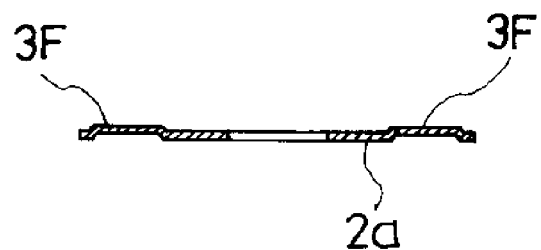
FIG. 10C shows another example of the end view cut along the line Z6-Z6 of FIG. 10A.

A plurality of ribs 3F shown in FIG. 10A are formed into an elliptical shape and provided side by side in the circumferential direction of the first expansion-side leaf valve 2a. Each rib 3F is provided to extend along a radial direction of the first expansion-side leaf valve 2a by being formed into an elliptical shape. Each rib 3F may be formed as such a rib that only an elliptical outlining part is recessed on the piston side and projecting on the opposite piston side as a cut surface thereof is shown in FIG. 10B or may be formed as such a rib that an inner side is also recessed on the piston side and projecting on the opposite piston side as shown in FIG. 10C.

Figure 11A:
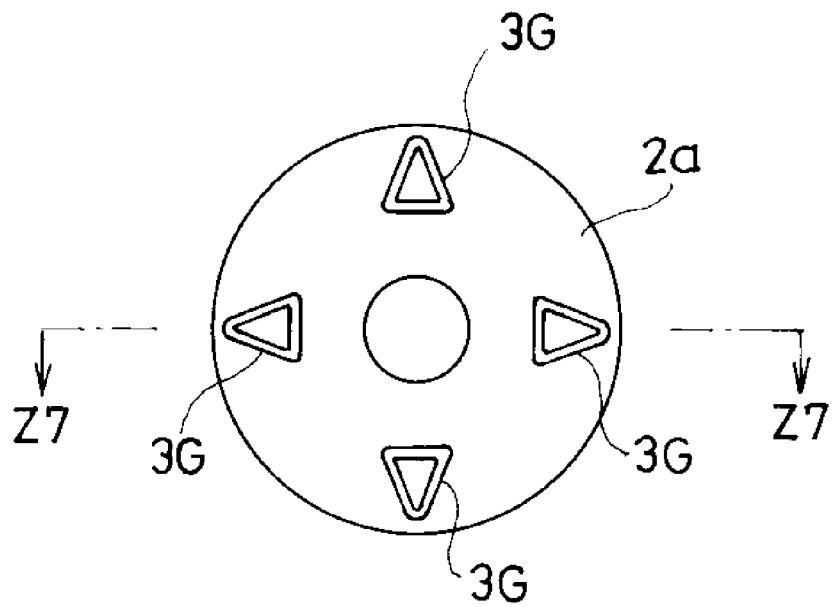
FIG. 11A is a plan view showing a fourth modification of the first expansion-side leaf valve according to the other embodiment of the present invention.
Figure 11B:
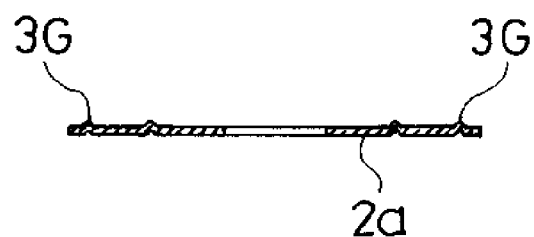
FIG. 11B shows an example of an end view cut along a line Z7-Z7 of FIG. 11A.
Figure 11C:
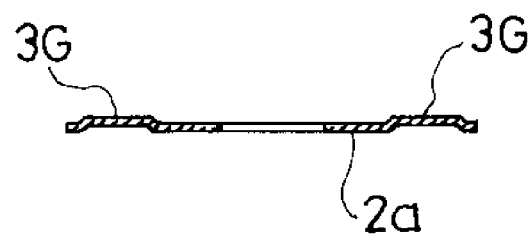
FIG. 11C shows another example of the end view cut along the line Z7-Z7 of FIG. 11A.

A plurality of ribs 3G shown in FIG. 11A are formed into a triangular shape and provided side by side in the circumferential direction of the expansion-side leaf valve 2a. Each rib 3G is provided to extend along the radial direction of the first expansion-side leaf valve 2a by being formed into a triangular shape. The rib 3G may be formed as a rib having such a cut surface that only an outlining part is recessed on the piston side and projecting on the opposite piston side as shown in FIG. 11B or may be formed as a rib having such a cut surface that an inner side is also recessed on the piston side and projecting on the opposite piston side as shown in FIG. 11C.

Figure 12A:
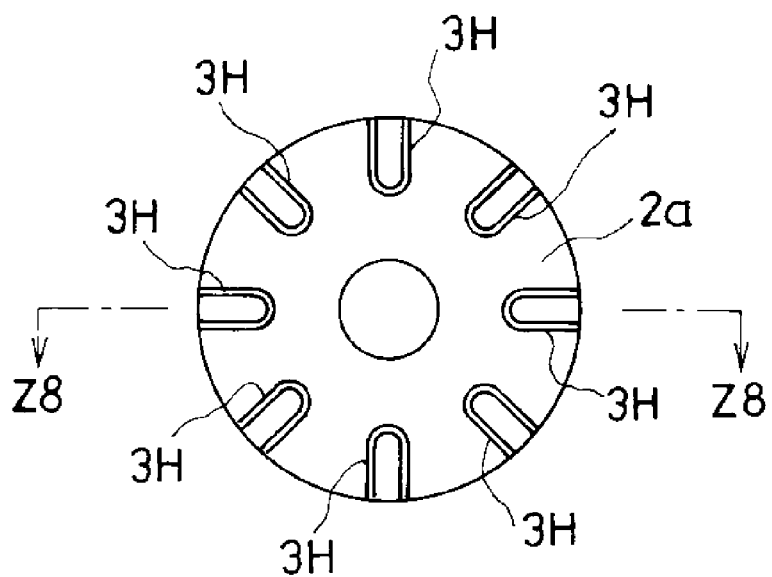
FIG. 12A is a plan view showing a fifth modification of the first expansion-side leaf valve according to the other embodiment of the present invention.
Figure 12B:
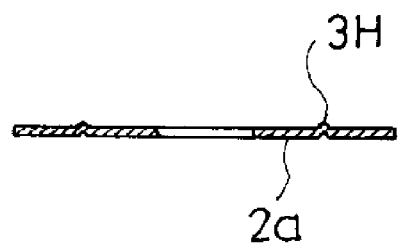
FIG. 12B shows an example of an end view cut along a line Z8-Z8 of FIG. 12A.
Figure 12C:
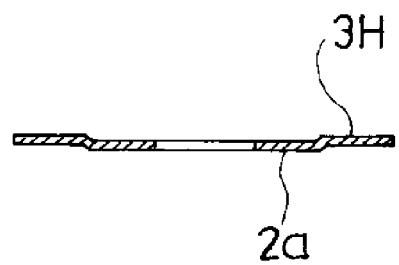
FIG. 12C shows another example of the end view cut along the line Z8-Z8 of FIG. 12A.

A plurality of ribs 3H shown in FIG. 12A are formed into a strip shape (U shape) and provided side by side in the circumferential direction of the expansion-side leaf valve 2a. Each rib 3H is provided to extend along the radial direction of the first expansion-side leaf valve 2a by being formed into a U shape. The rib 3H may be formed as a rib having such a cut surface that only an outlining part is recessed on the piston side and projecting on the opposite piston side as shown in FIG. 12B or may be formed as a rib having such a cut surface that an inner side is also recessed on the piston side and projecting on the opposite piston side as shown in FIG. 12C.

Further, all the ribs 3D to 3H shown in FIGS. 8 to 12 are recessed on the piston side and projecting on the opposite piston side similarly to the rib 3B. Thus, it is possible to form orifice(s) between the rib(s) 3D to 3H and the valve seat 62 and apply initial deflection corresponding to the height of the rib(s) 3D to 3H to the second and subsequently expansion-side leaf valves 2b, 2c. Further, the rib(s) 3D to 3H is/are set to extend outward (direction separating from the center of the leaf valve 2a) from the central side of the first expansion-side leaf valve 2a and intersect with the circular annular valve seat 62.

Accordingly, the rib 3B can be arranged at the position facing the valve seat 62 even without positioning the piston 6 and the first expansion-side leaf valve 2a.

In a case where the rib(s) 3A to 3H can be set to constantly face the valve seat and form the orifice(s), the shape of the valve seat combined with the rib(s) 3A to 3H can be arbitrarily set. Further, the ribs 3A to 3H may be freely combined and these may be arbitrarily combined.

In each of the above embodiments, only the first expansion-side leaf valve 2a includes the rib(s) 3A to 3H, the orifice(s) is/are formed between the rib(s) and the valve seat(s) 12, 62 and initial deflection is applied to the second and subsequent expansion-side leaf valves 2b, 2c. Contrary to this, the rib(s) 3A to 3H may be provided on the first compression-side leaf valve 7a, orifice(s) may be formed between the rib(s) and the valve seat(s) 16, 66 and initial deflection may be applied to the second and subsequent expansion-side leaf valves 7b, 7c.

This application claims priority based on Japanese Patent Application No. 2013-016880 filed with the Japan Patent Office on Jan. 31, 2013, the entire contents of which are incorporated into this specification.

The invention claimed is:

1. A shock absorber, comprising:
a valve disc defining two chambers;
a flow passage formed in the valve disc, the flow passage allowing communication between the two chambers;
a window formed in the valve disc, the window being connected to the flow passage;
a valve seat formed on the valve disc, the valve seat surrounding the outer periphery of the window;
a first leaf valve formed in the shape of an annular plate, the first leaf valve being provided such that an outer peripheral part is seatable on and separable from the valve seat, the first leaf valve including a rib provided at a position facing the valve seat, the rib being recessed on a valve disc side and projecting on an opposite valve disc side, thereby forming an orifice between the rib and the valve seat; and at least one deflectable leaf valve stacked on the first leaf valve, initial deflection being applied to the deflectable leaf valve by the rib, wherein the valve seat has a radial seating surface extending outward from a central side of the valve disc, and the rib is formed into a circular annular shape to overlap the radial seating surface in an axial direction.

2. A shock absorber, comprising:

a valve disc defining two chambers;

a flow passage formed in the valve disc, the flow passage allowing communication between the two chambers;

a window formed in the valve disc, the window being connected to the flow passage;

a valve seat formed on the valve disc, the valve seat surrounding the outer periphery of the window;

a first leaf valve formed in the shape of an annular plate, the first leaf valve being provided such that an outer peripheral part is seatable on and separable from the valve seat, the first leaf valve including a rib provided at a position facing the valve seat, the rib being recessed on a valve disc side and projecting on an opposite valve disc side, thereby forming an orifice between the rib and the valve seat; and at least one deflectable leaf valve stacked on the first leaf valve, initial deflection being applied to the deflectable leaf valve by the rib, wherein the valve seat is formed into a circular annular shape, and the rib is formed to extend outward from a central side of the first leaf valve and overlap the valve seat in an axial direction.

3. A shock absorber, comprising:

a valve disc defining two chambers;

a flow passage formed in the valve disc, the flow passage allowing communication between the two chambers;

a window formed in the valve disc, the window being connected to the flow passage;

a valve seat formed on the valve disc, the valve seat surrounding the outer periphery of the window;

a first leaf valve formed in the shape of an annular plate, the first leaf valve being provided such that an outer peripheral part is seatable on and separable from the valve seat, the first leaf valve including a rib provided at a position facing the valve seat, the rib being recessed on a valve disc side and projecting on an opposite valve disc side, thereby forming an orifice between the rib and the valve seat; and at least one deflectable leaf valve stacked on the first leaf valve, initial deflection being applied to the deflectable leaf valve by the rib, wherein the rib is located inward from an outer edge of the leaf valve and extends annularly around the leaf valve, such that the orifice extends annularly around the leaf valve, and wherein the valve seat defines a first side of the window and a second side of the window opposite the first side in an annular direction around the valve disc, and the orifice extends annularly between the first side of the window and the second side of the window.

* * * * *